(No Model.)  2 Sheets—Sheet 1.
J. STEUDLE.
HOUSEHOLD PRESS.
No. 472,559.  Patented Apr. 12, 1892.
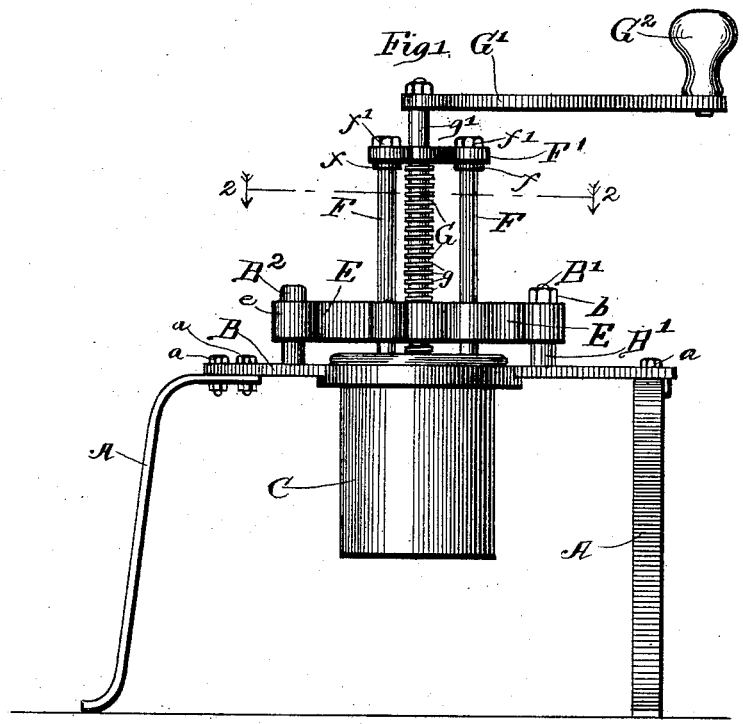
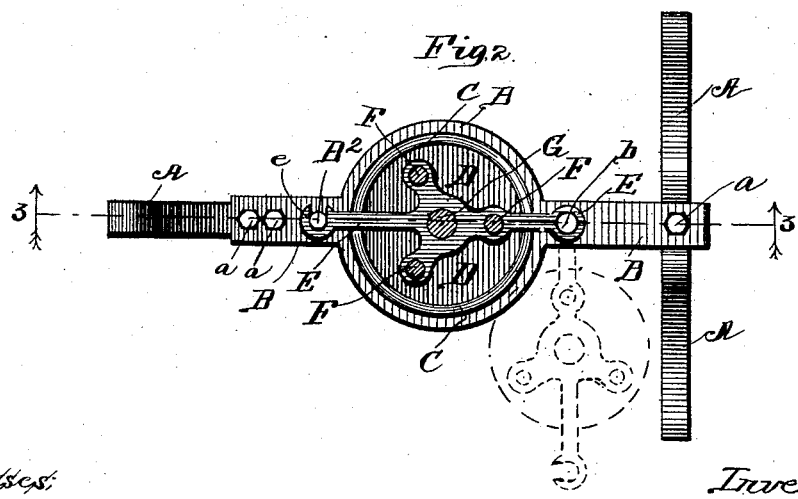
Witnesses:
Lute S. Alter
Tessa G. Parrish
Inventor:
John Steudle
By Charles T. Brown
Atty.

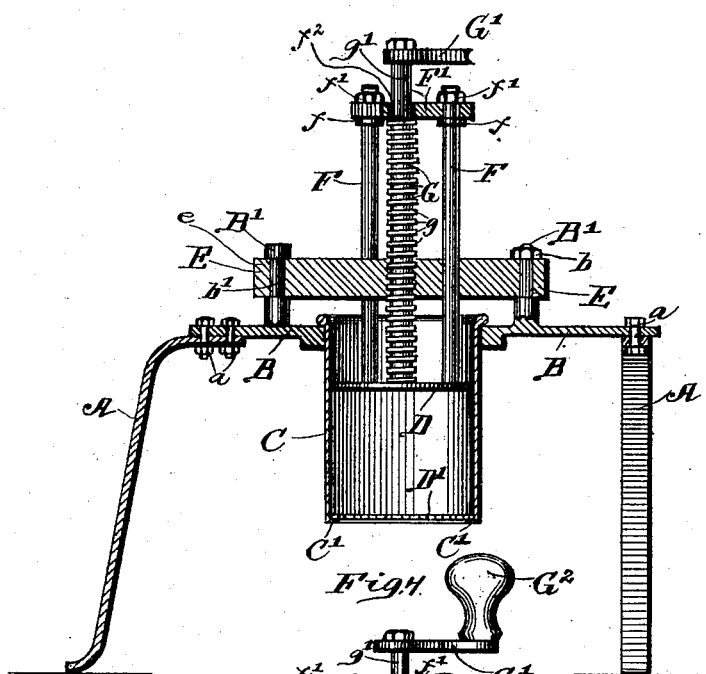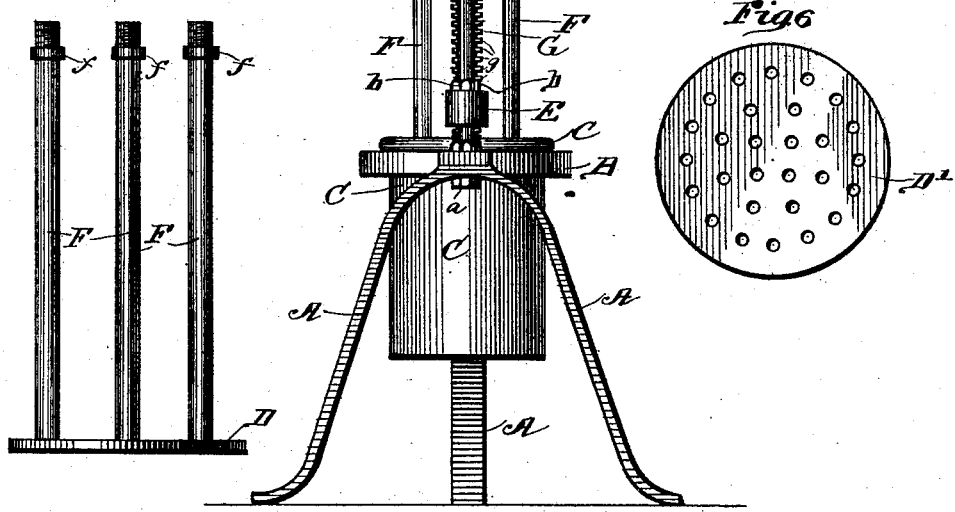

UNITED STATES PATENT OFFICE.

JOHN STEUDLE, OF CHICAGO, ILLINOIS.

HOUSEHOLD PRESS.

SPECIFICATION forming part of Letters Patent No. 472,559, dated April 12, 1892.

Application filed July 28, 1891. Serial No. 400,988. (No model.)

*To all whom it may concern:*

Be it known that I, JOHN STEUDLE, residing at Chicago, in the county of Cook and State of Illinois, have invented certain new and useful Improvements in a Press for Household and other Uses, of which the following, in connection with the drawings, is a full and complete description.

My invention relates to that class of machines or utensils whereby pressure can be applied to articles contained in a receptacle having a perforated wall or bottom and thereby the article so contained in the receptacle or the liquid contained in and forming a part of the article may be forced from the receptacle through the perforations in the bottom or wall thereof; and the objects of this invention are to obtain a machine of the character named, which can be easily manipulated by one not accustomed to machinery, as a cook, which can be readily maintained in a cleanly condition when used in and about the preparation of food, and particularly to obtain a machine wherein dough may be placed in the receptacle of the machine and afterward pressed therefrom through perforations in the bottom of the receptacle. For the purpose of cleaning such a machine after dough has been forced therefrom the machine must be so constructed that each of the parts thereof with which the dough is brought in contact may be removed from the machine or so placed that it can be readily gotten at in every part thereof, and this machine being constructed so as to be well adapted for use in forming dough into strings or rolls and for cleaning after such use it may be said to have been primarily designed for the purpose of enabling a cook or housewife to prepare such food article, (the same being particularly desirable for use in soups in place of dumplings,) although, as hereinbefore stated, the machine is well adapted for expressing the liquor thereof from articles or things containing it, such as fruits, berries, and the like.

I have illustrated my invention by the drawings forming a part hereof, in which—

Figure 1 is a side elevation of the machine. Fig. 2 is a sectional view on line 2 2 of Fig. 1, viewed in the direction of the arrows. Fig. 3 is a cross-section of the machine on line 3 3 of Fig. 2, viewed in the direction of the arrows. Fig. 4 is an end elevation of the machine. Fig. 5 is an elevation of a movable disk forming a part of the machine and of rods or posts rigidly secured thereto, and Fig. 6 is a plan view of a perforated plate adapted to form the bottom of the receptacle of the device.

The same letter of reference is used to indicate a given part where more than one view of such part is shown.

A are legs supporting the base B of the device, being secured to such base B by bolts $a\, a$.

C is a cylinder adapted to fit into a hole in the base B and to be held in position therein by a flange or rim extending around the upper part of such cylinder C.

D is a movable disk, which can be forced into cylinder C or withdrawn therefrom by the means hereinafter described, and D' is a perforated disk adapted to fit into the cylinder C. Disk D' is removable from the cylinder C, being held therein when a receptacle is to be formed by the combination of the cylinder C and the perforated bottom D' by the flange or projecting rim C', Fig. 3.

E is a bar pivoted on pin B' (such pin B' extending upward from the base B) and held on the pin by nut $b$. This bar E has a pivotal movement or swing in a horizontal plane on the pivot B'.

$e$ is a hook at the other end of the arm E, such hook $e$ being adapted to fit over pivot B², which is also rigidly secured to the base B. When the arm E is in the position indicated by the dotted lines in Fig. 2 of the drawings, the receptacle formed of the cylinder, combined with the perforated bottom D', can be taken from the base B; but when the arm E is in the position illustrated by the full lines in the drawings the vertical screw G, which passes through the arm E, is in, or nearly so, the central or axial line of cylinder C, and if such cylinder is then raised in the base B it will be drawn over disk D. The rods F F, which are rigidly attached to the base B, are equally distant from the axial line of the vertical screw-shaft G. Rods F F F extend through holes in the bar E, fitting loosely in such holes.

F' is a triangular-shaped head having holes therein adapted to fit over the rods F, and such head is placed over the rods and against the shoulders $f\,f\,f$ on such rods and there held firmly by nuts (or equivalent fastening devices) $f'\,f'\,f'$.

$g$ is a screw-thread on screw-shaft G, and $g'$ is the portion of the screw-shaft G, having no thread thereon and of lesser diameter than the part thereof having such screw-thread.

$f^2$ is a hole in the center of the head F', which forms a journal, in which part $g'$ of the screw-shaft G loosely fits, such screw-shaft being thereby rotatably held therein.

G' is an arm secured to screw-shaft G, having handle $G^2$ at the outer end thereof, by which the screw-shaft may be rotated. The lower end of the screw-shaft G abuts against, but is not connected with, the disk D.

The operation of the machine is as follows: The perforated disk D' is placed in cylinder C against the flange C' at the bottom thereof, and the receptacle formed by such cylinder and perforated disk is then placed in base B in the position illustrated in the drawings, after which the bar E is swung from the position indicated by the dotted lines in Fig. 2 into the position illustrated by the full lines in the figures, with the hook $e'$ of such bar engaging with the pivot $B^2$ provided therefor. The article to be pressed in or from the receptacle formed by cylinder C, combined with the perforated bottom D', is then placed in such receptacle and the disk D forced downward thereon by turning the screw-shaft G, the screw-threads $g$ fitting into like screw-threads in the hole in bar E. As the screw is forced downward the lower end of such screw, abutting against the disk D, forces such disk to move downward in front or ahead of the screw. When sufficient pressure has been obtained upon the article contained in the receptacle of the device or such article has been forced therefrom, the disk D can be withdrawn from the receptacle by reversing the direction of the rotation of the vertical screw-shaft G, in which case the head F' is raised on the screw, and as such head is raised it raises the rods F F F, which rods, being secured to the disk D, raise the disk therewith.

It will be observed that by the use of three of the rods F F F, arranged as described, such rods, in addition to connecting the head F' with the disk D, thereby causing such disk to be raised with the raising of the head F', serve, in combination with bar E, through which such rods pass, head F', and vertical screw-shaft G, to maintain the disk D in a horizontal position as the same is forced downward, and the maintenance of such disk D in a horizontal position by such rods F acting in combination, as described, with the bar E, head F, and vertical screw-shaft G is by me deemed a very desirable and necessary function in the device, whereby it is adapted for general use by those not skilled in the use of machinery.

Having thus described my invention, its construction and method of operation, what I claim, and desire to secure by Letters Patent, is—

In a press, the combination of a receptacle having a perforated bottom, a frame in which such receptacle is removably held, a pivoted bar extending when closed across the upper open end of such receptacle and when opened away from over the receptacle, a vertical screw-shaft extending through such bar and threads on such shaft intermeshing with threads in the hole in such bar through which it extends, a horizontal disk against which the lower end of the vertical screw-shaft abuts, vertical rods attached to such disk, such rods extending through and movable in holes in the pivoted bar, a connecting-head secured at the upper end of such rods thereto and attaching them together, such connecting-head having a hole therein through which the vertical screw-shaft passes above the screw-threads thereon and in which hole such screw-shaft is rotatable, and a handle by which such screw-shaft can be actuated, substantially as described.

JOHN STEUDLE.

Witnesses:
CHRISTIAN WENGEL,
CHARLES T. BROWN.